United States Patent [19]
Schoen et al.

[11] Patent Number: 5,592,511
[45] Date of Patent: Jan. 7, 1997

[54] DIGITAL CUSTOMIZED AUDIO PRODUCTS WITH USER CREATED DATA AND ASSOCIATED DISTRIBUTION AND PRODUCTION SYSTEM

[76] Inventors: Neil C. Schoen; Wendy A. Schoen, both of 9817 Freestate Pl., Gaithersburg, Md. 20879

[21] Appl. No.: 593,295

[22] Filed: Jan. 29, 1996

Related U.S. Application Data

[63] Continuation of Ser. No. 240,454, May 10, 1994, abandoned.

[51] Int. Cl.⁶ .............................. H04B 1/38; H04L 5/16
[52] U.S. Cl. .................. 375/220; 348/7; 455/2; 455/4.2
[58] Field of Search ..................... 375/240, 219, 375/260, 220; 348/6, 7, 1, 3; 455/2, 3.1, 4.1, 4.2, 5.1

[56] References Cited

U.S. PATENT DOCUMENTS

| | | | |
|---|---|---|---|
| 5,132,992 | 7/1992 | Yurt et al. | 375/240 |
| 5,253,275 | 10/1993 | Yurt et al. | 375/240 |

*Primary Examiner*—Stephen Chin
*Assistant Examiner*—Don Vo

[57] ABSTRACT

A system for creation of user-selected customized audio products, defined as a plurality of songs from different recording artists recorded on a single compact disc (CD) or digital audio tape (DAT) cassette, at record store/distributor locations utilizing a digitized, central database with production hardware at distributor sites. Customized products consist of CD ROM or digital audio tapes (DAT) with music or voice content selected from large digital database, and are written at local workstations at distribution centers (such as record stores) which are connected by a high-speed communications network. The system records costs of the digitized audio (e.g., royalties for individual songs) for billing purposes, as well as producing descriptive material (contents, background information, and graphics for labels, etc.). Data transfer and production is faster than real-time, and thus will be a significant improvement and will tend to reduce current analog hardware-to-hardware transfer ("pirating") which violate copyright laws and is unauthorized. The system consists of integrated, state-of-the-art digital databases, communications networks, computer workstations, and unique workstation processing software, and provides an innovative product/service (individual customized albums or audio data compilations) which currently do not exist.

9 Claims, 3 Drawing Sheets

DIGITAL CUSTOMIZED AUDIO PRODUCTS WITH USER CREATED DATA AND ASSOCIATED DISTRIBUTION AND PRODUCTION SYSTEM

This application is a continuation, of application Ser. No. 08/240,454, filed May 10, 1994, now abandoned.

BACKGROUND

There currently is an "underground" market for custom record albums stored on audio tapes. These custom albums are made, for example, using dual cassette tape decks from albums borrowed from others, with selected songs copies onto a custom compiled tape. They require a fair amount of time to assemble, and represent lost revenue to the record companies, since unauthorized copies of property subject to royalties are made. With the advent of CD-ROM storage media, copies can no longer easily be made.

The system described herein will allow rapid creation of customized CD-ROM recordings, with proper royalty payments, and thus should greatly expand a newly emerging market for customized audio products. These CD-ROM customized albums can be created at a central location from remote inputs, or at distributed locations (such as record stores) from a central database or distributed databases, using high-speed CD-write devices.

It should be noted that the audio information is not necessarily constrained to music, and can encompass additional areas suitable for customization, including currently existing markets for personal self-improvement, business lectures, and other forms of audio data marketed to the public. As indicated in the Abstract, Background and Claims segments of the application, still-video or visual text information may also be included with the traditional music audio data, including textual data on recording artists, still photos of the artists and graphics for custom album production. For other custom audio products, such as customized business lectures, scientific material, and integration of exerpts from books and/or speeches, still-visual data (such as text, graphs, drawings and/or photos) may be included for off-line publication and use while listening to the audio information, or included in a multi-media, integrated CD-ROM playable, for example, on current personal computer systems.

SUMMARY OF INVENTION

The major components of a digital customized audio distribution system generated in accordance with the present invention consist of the following subsystems.

A centralized digital database of audio information is created by use or conversion of audio data existing on current media (CD-ROMs, audio tapes, or currently digitized information). This database is installed on a central computer/file server memory system. Sufficient storage capacity is needed to hold the expected volume of audio data, which needs to be rapidly accessible for transmission to user sites. Current optical and magnetic disc technology is suitable, with total storage requirements estimated at several tera-bytes ($10^{12}$) for music applications (>10,000 files).

User workstations are required as point-of-sales (POS) or production devices which function in several modes. Initial customer information is input (selection of audio data) to the workstation and forwarded to the (central) database to retrieve the required data. The digital data is returned to the appropriate workstation by the central file server, along with billing information associated with the requested data (royalty fees, etc.). If a centralized production configuration is utilized, the workstation is simply a POS device that provides billing information to the customer. If a distributed production system is utilized, then the workstation controls an output device (CD-W, a compact disc write-only device to produce the CD-ROMs, or an audio tape [analog or digital audio tape (DAT)]).

The production subsystem, or output device, is a high-speed write device to produce the custom audio product. This can be a 6×CD-ROM disc recorder, or a high-speed DAT tape unit. To handle the expected volume, and for rapid order response, the audio product is produced at speeds of the order of 10 times the normal playback speed.

The final component of the overall system is the communications network. In the most general configuration, the communications network provides connectivity from the user/distributor to the digital database(s). Since there are several configurations possible for the distribution system, the communications network can be significantly different for each configuration.

The most general case is for a fully distributed system, in which databases and users are at many locations. In this configuration, a high-speed communications link is needed between a database site and a production site. This could be a satellite dish system to provide the high data transmission rates necessary for "quick-turn around" production, or a high-speed telephone link (e.g., a $T^1$ link) if volume warrants the expense. Also, a slower speed communications link is necessary to collect billing information at a central site for collection and distribution of fees. This can be provided by conventional modem technology driven from a software POS billing system or a hardware "meter" that collects and stores billing data for transmission to the billing site.

DETAILED DESCRIPTION OF PREFERRED EMBODIMENTS

Figure 1:
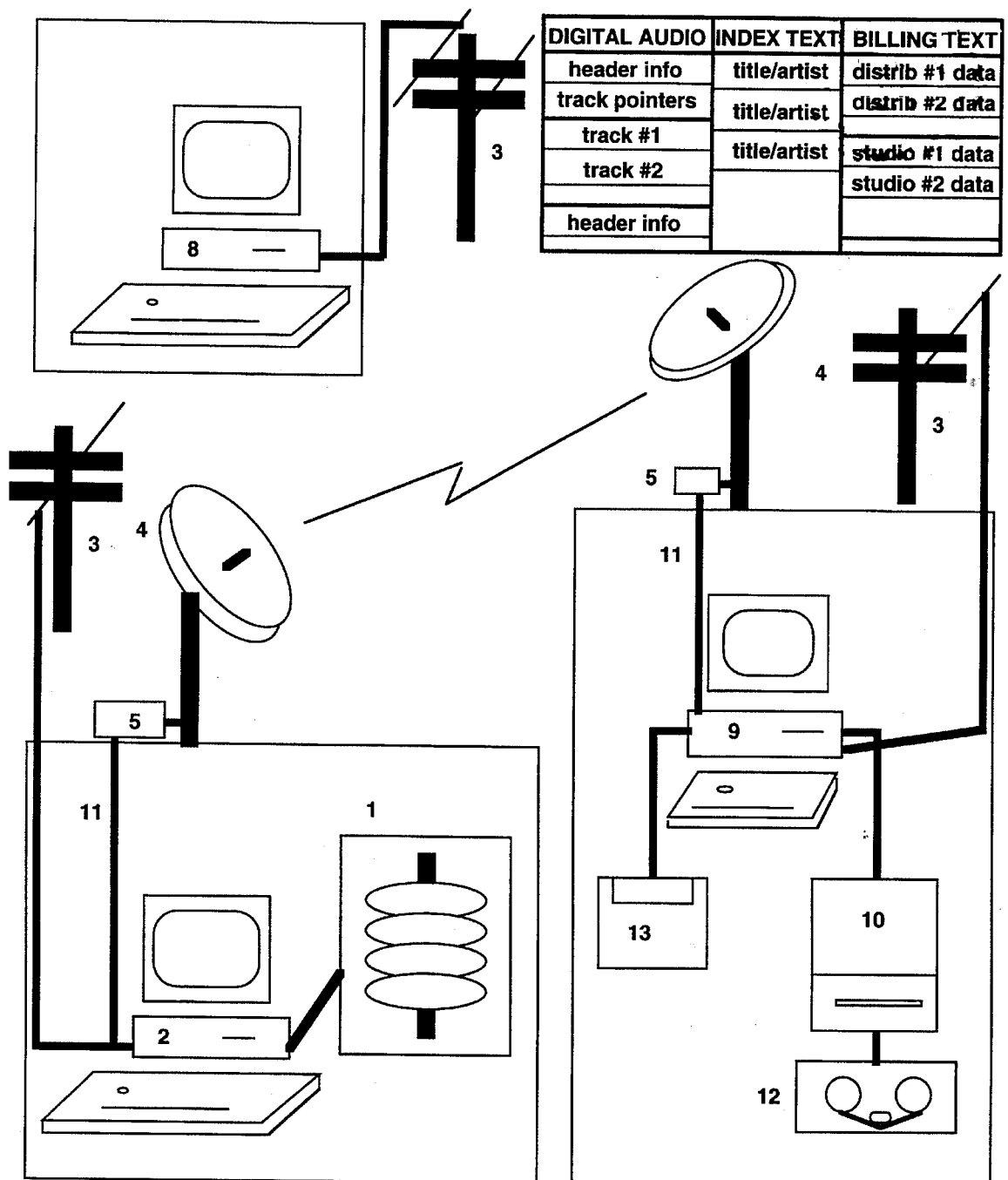
FIG. 1 is a diagram showing a preferred embodiment of a system in accordance with the present invention for providing digital customized audio products from distributed digital databases to distributed customer locations, where the user-selected audio is processed into playback media such as CD-ROMs or digital audio tapes.

The basic components of a system configured for the most flexible operation are shown in FIG. 1 as a preferred embodiment. This is one of several potential systems, and should not be construed to limit the scope of this invention in any way.

A centralized database (1) containing some portion of the total available data is created on a large, fast storage media such as computer fixed hard drive discs (magnetic or magneto-optical). The storage media speed for data transfer needs to be 5–10 times the playback speed of the audio data, which should set a lower bound of about 1–2 Mbytes/sec, well within current technology. Storage requirements for a massive, single site archive could be as high as $5 \times 10^{12}$ bytes (5 tera-bytes) for the equivalent of a 10,000 song library. If the databases are distributed, which could be the case for various record companies maintaining their own data sites, then storage requirements could be significantly lower, allowing the use of smaller, file server network systems and lowering the cost of a given site.

A small computer system (2) that controls the database is used to retrieve the user-selected data/files for eventual transfer to playback media (CD-ROM, DAT, etc.). The data files will contain a standard header (7) which will contain data/pointers to provide access to billing/royalty data and other descriptive material associated with that file. Data from the header is accessed by the computer (2) controller when it is packaged for transmission. Billing and packaging data is sent through a modem in the computer (2) to standard telephone lines (3) for transmission to a central order/billing site computer system (8).

The central order/billing computer (8) receives data from the customer at a remote site, which could be a record store, via an order entry/production computer (9). This data consists of the customer selected audio information requested (songs and other audio data, etc.) to be compiled and written to playback media (CD-ROM/tape). The central billing site computer forwards the file information via telephone lines (3) to the database control computer (2) which retrieves the data and queues it for transmission to the remote site by a satellite antenna (4) link via a commercial geosynchronous satellite (6) transponder. To maintain the data transfer rate, the link between the antenna and central database should be a coaxial or fiber optic cable (11). An optimal encryption device/billing unit (5) will protect the data from unauthorized interception and can also retrieve billing information from the data headers for direct billing (versus via the central order/billing computer(8).

After the data is transmitted via satellite to the production computer (9), it is transferred to a CD-ROM (10) or audio tape (12). A printer (13) provides data for the customer on the contents (such as textual information, graphics or photos related to the audio data) of the disc or tape, as well as a bill for the cost of the product. Existing computer networks, such as the Internet, could be used for all the non-time-critical data transfers, such as initial content selection, billing data transfer, routing of requests to the high-speed transmission system, etc.; this could significantly reduce the need for expensive, customized hardware/software systems and broaden user access.

Figure 2:
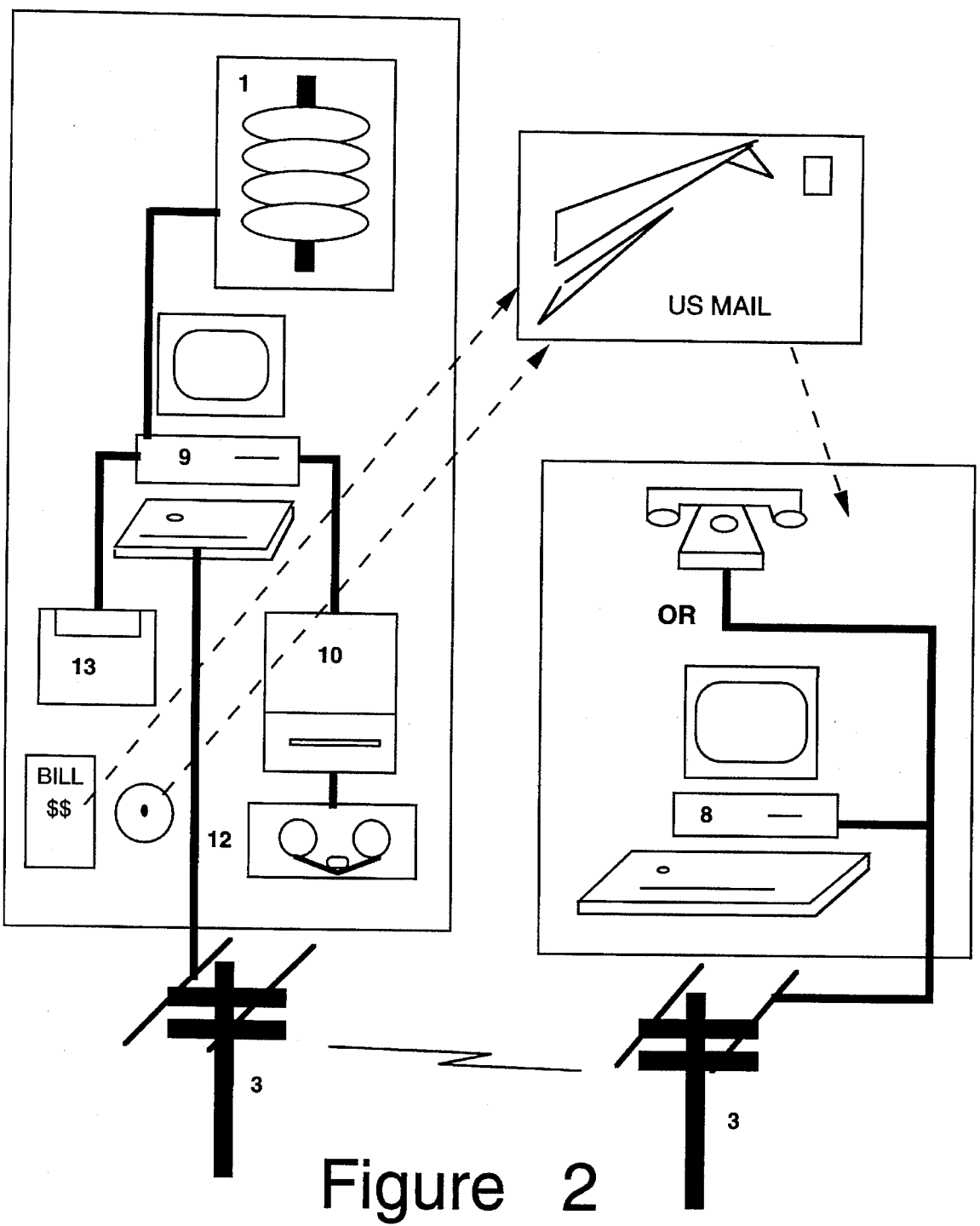
FIG. 2 shows a diagram for an alternate embodiment for a system with a centralized database and centralized order processing subsystem.

FIG. 2 shows a centralized database and production system embodiment. In this configuration, everything is done at a single central site, and the resulting product is mailed to the distributor or customer. No high-speed, satellite data links are necessary since the discs or tapes are produced at the database site. Customer data can be simply telephoned (by voice) to the central site, or a computer system could be used; both would use a low-speed standard telephone line (3).

Figure 3:
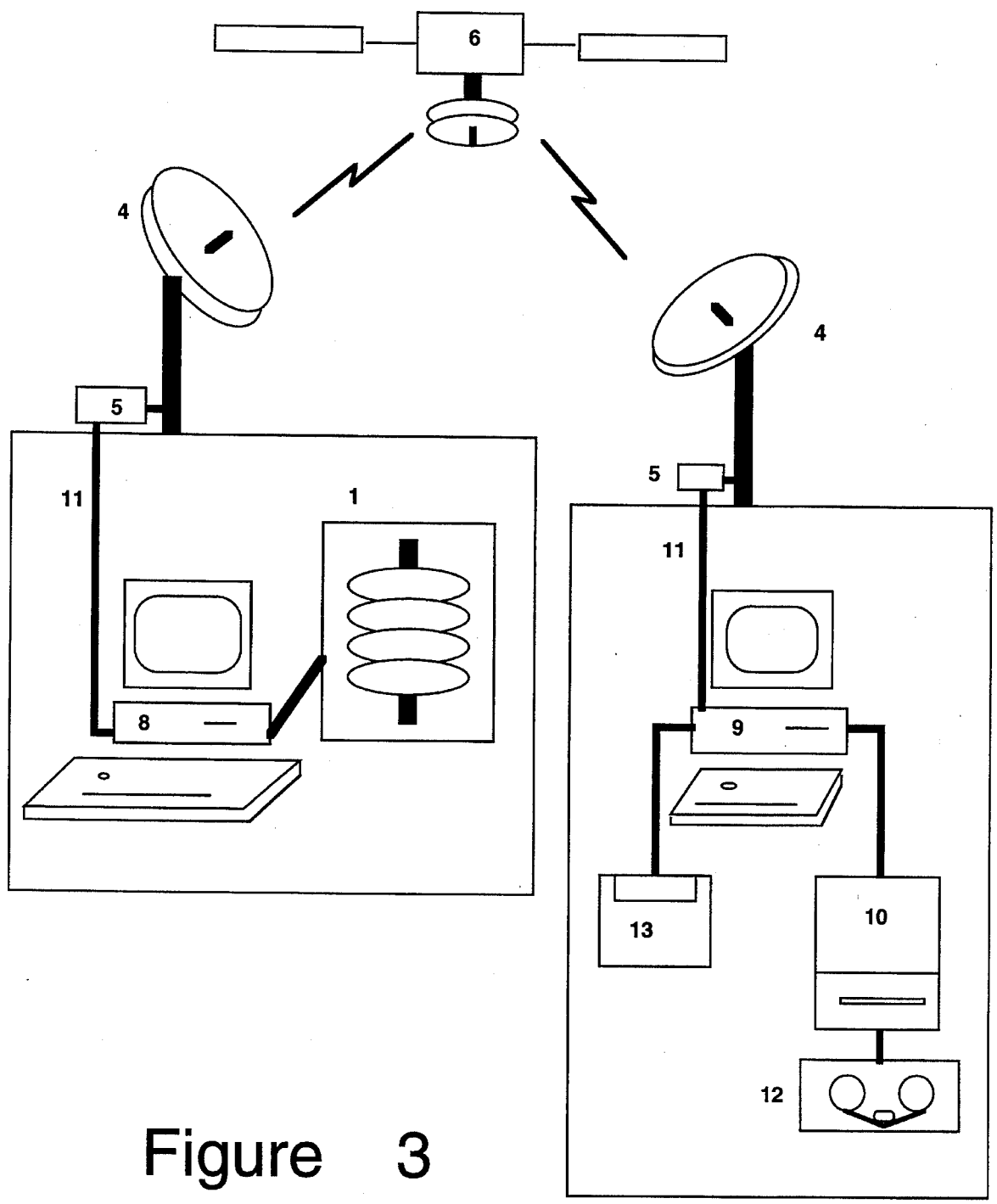
FIG. 3 is a diagram of yet another embodiment showing a centralized database and a distributed order and processing subsystems.

A third alternative, shown in FIG. 3, has a central database and billing site, with distributed production sites. Encryption devices/billing unit "meters" (5) allow for protection of data and a simplified billing process using hardware, as opposed to a software implementation. Such technology is currently available in the marketplace.

Accordingly, it is to be understood that the drawings and descriptions herein are offered by way of example to facilitate comprehension of the invention and should not be construed to limit the scope thereof.

It should be noted that the essence of this invention is the integration of existing or soon to be available technologies to create a new market and mode for the customized assembly and distribution of audio data.

What is claimed is:

1. Systems for creation of user-created, customized audio products at record stores and distribution sites from digital databases remotely located at a plurality of recording company sites, consisting of:

means for creating addressable digital databases of audio information;

means for retrieving selected data/audio files from said databases;

means for transmitting said data/audio files to customers at record stores and distribution sites and interactively including customer-created data;

means for producing at faster than playback speed, at said record stores and distribution sites, customized playback media products, including optical compact discs (CDs) and digital audio tapes (DATs), containing compilations of said data/audio files, wherein said data/audio files consist of a plurality of previously recorded and customer-provided audio information and associated text/graphics material, at the level of individual songs and portions of voice data, text material, and still photographs, which are then assembled into a customized compilation to become said CD and DAT customized playback media products; and means for collecting billing data and distributing invoices for royalties and other associated fees to owners and operators of the data/audio files and the transmitting and distribution systems.

2. A system as defined in claim 1 wherein said means for producing customized playback media products is at a centralized production site.

3. A system as defined in claim I wherein said means for transmitting said data/audio files includes the encryption of data and subsequent decoding at the record stores and distribution sites or media product production site.

4. A system as defined in claim 1 wherein all said means for receiving and transmitting said data/audio files and said billing data are provided by existing or newly created Internet sites.

5. A system as defined in claim 1 wherein said means for collecting billing data and distributing invoices for royalties and other associated fees utilizes distributor/customer site electronic hardware "meters" which can record data/file receipt for later transmission to billing computers.

6. A system as defined in claim 1 wherein said means for transmitting said data/audio files employs means for transmission at faster-than-playback data rates, using communications satellite up-links/down-links and coaxial or fiber optic feed adjacent to said means for producing customized playback media products.

7. A system as defined in claim 1 wherein said customized playback media products containing customized compilations of said audio files include a plurality of songs from different recording artists, excerpts from customer-created and existing audio data of literature, speeches, scientific material in audio format and business development/motivational/self-improvement material in audio format.

8. A system as defined in claim 1 wherein said means for producing said customized playback media products, including CD-ROMs, CDs, digital audio tapes, and analog recorded cassette tapes, record at faster than real time audio speeds to greatly reduce the time a customer waits to obtain a custom playback product.

9. A system as defined in claim 1 wherein said data/audio files included in customized playback media products include still-video images, graphics and text visual data which are complementary data which can be produced in hard copy form and included along with said customized playback media products.

* * * * *